D. W. HULL.
Milk-Cooler.

No. 217,221.   Patented July 8, 1879.

Witnesses.
Harry King.
D. P. Cowl

Inventor.
Douglass W. Hull
By his Attorneys,
Stansbury & Munn

UNITED STATES PATENT OFFICE.

DOUGLASS W. HULL, OF MAINE, NEW YORK.

IMPROVEMENT IN MILK-COOLERS.

Specification forming part of Letters Patent No. 217,221, dated July 8, 1879; application filed May 8, 1879.

*To all whom it may concern:*

Be it known that I, DOUGLASS W. HULL, of Maine, in the county of Broome and State of New York, have invented certain new and useful Improvements in Milk-Coolers; and I do hereby declare that the following is a full, clear, and exact description of the invention, which will enable others skilled in the art to which it appertains to make and use the same, reference being had to the accompanying drawings, and to letters of reference marked thereon, which form a part of this specification.

Figure 1:
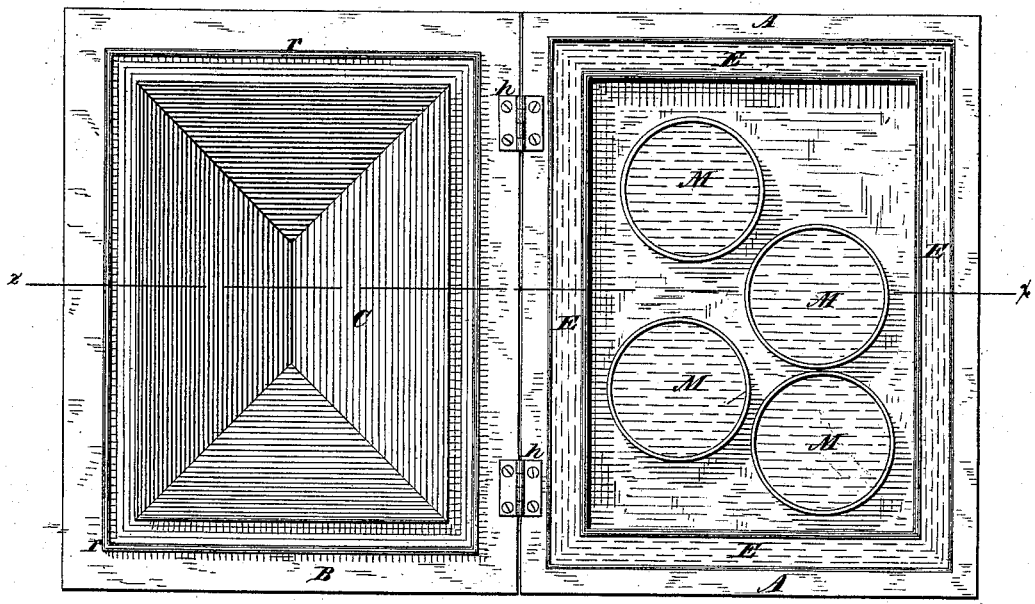
Figure 2:
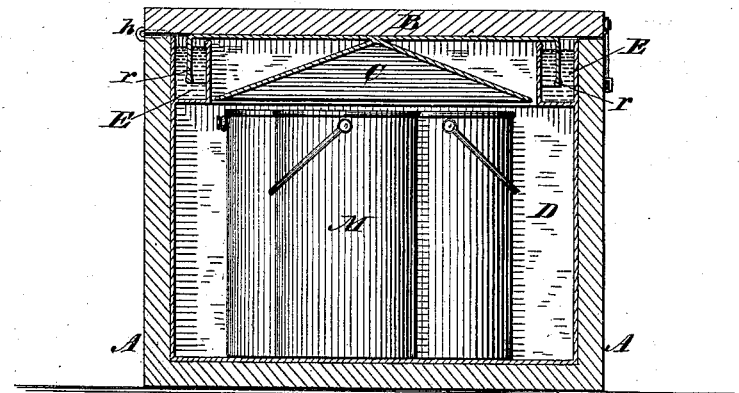

Figure 1 is a top view of my improved milk-cooler with the cover thrown back. Fig. 2 is a vertical section on line $x\ x$ of Fig. 1.

The same letter marks the same part in both figures.

My invention consists in the peculiar construction of the receptacle for milk-cans, hereinafter described, whereby the cooling-chamber is rendered air-tight and self-sealing, and is provided with means for so directing the condensed vapors that they will fall into the chamber near its sides and be diverted from the cans, all as hereinafter fully set forth.

It is well settled that when milk is confined in a cold chamber from which the atmosphere is perfectly excluded the cream will more rapidly and completely separate from it.

My receptacle I form of wood, having any suitable non-conducting packing and a metallic lining.

In the drawings, A marks the walls of the cooling-chamber D, and B the cover, hinged to the body at $h$. Around the upper margin of the chamber D is formed a trough, E, into which dips the rim $r$ of the metal-lined cover B. The trough E is to be partly filled with water or other suitable liquid, so that when the cover B is shut down the chamber D will be completely sealed air-tight.

To the lining of the cover B is attached the condenser C, formed of the inclined metallic plates, as shown.

M M are the milk-cans, which are placed in the cooling-chamber D along with a proper quantity of ice to produce the desired refrigeration.

The vapors rising from the milk are condensed by coming into contact with the lower side of the condensing-plates C, and run down and fall off from its edges near the sides of chamber D, and do not drop into the milk.

I claim—

The combination, with the chamber D, provided with the sealing-trough E, of the cover B, provided with the rim $r$, and inclined condenser C, the whole constructed and operating as described, for the purposes specified.

In testimony that I claim the foregoing as my own invention I affix hereto my signature in presence of two witnesses.

DOUGLASS W. HULL.

Witnesses:
GEO. F. GRAHAM,
CHAS. F. STANSBURY.